United States Patent
Rangapuram et al.

(10) Patent No.: US 10,990,483 B2
(45) Date of Patent: *Apr. 27, 2021

(54) MINIMIZING A FOOTPRINT OF INCREMENTAL BACKUPS

(71) Applicant: EMC IP Holding Company LLC, Hopkinton, MA (US)

(72) Inventors: Ravi Kishore Yadav Rangapuram, Bangalore (IN); Sridhar Surampudi, Pajahmundry (IN); Pavan Kumar Dattatreya Ati, Bangalore (IN)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 125 days.

This patent is subject to a terminal disclaimer.

(21) Appl. No.: 16/151,038

(22) Filed: Oct. 3, 2018

(65) Prior Publication Data

US 2019/0034288 A1 Jan. 31, 2019

Related U.S. Application Data

(63) Continuation of application No. 14/871,145, filed on Sep. 30, 2015, now Pat. No. 10,102,078.

(51) Int. Cl.
| | |
|---|---|
| *G06F 16/10* | (2019.01) |
| *G06F 11/14* | (2006.01) |
| *G06F 16/11* | (2019.01) |
| *G06F 16/17* | (2019.01) |

(52) U.S. Cl.
CPC ........ *G06F 11/1451* (2013.01); *G06F 16/128* (2019.01); *G06F 16/1727* (2019.01); *G06F 2201/84* (2013.01)

(58) Field of Classification Search
None
See application file for complete search history.

(56) References Cited

U.S. PATENT DOCUMENTS

| | | | |
|---|---|---|---|
| 7,827,146 B1 | 11/2010 | De Landstheer | |
| 7,873,549 B1 | 1/2011 | Mishra | |
| 7,873,601 B1* | 1/2011 | Kushwah | G06F 11/1451 707/654 |
| 8,301,602 B1* | 10/2012 | Jiang | G06F 16/17 707/649 |
| 8,484,427 B1* | 7/2013 | Goldobin | G06F 11/1453 711/162 |
| 8,732,417 B1* | 5/2014 | Stringham | G06F 11/1448 711/162 |
| 9,152,638 B1* | 10/2015 | Naftel | G06F 16/11 |
| 9,811,542 B1 | 11/2017 | Payne | |
| 2001/0013102 A1 | 8/2001 | Tsuchiya | |
| 2009/0006496 A1* | 1/2009 | Shoens | G06F 16/1873 |
| 2012/0110287 A1* | 5/2012 | Han | G06F 3/068 711/162 |
| 2015/0269032 A1* | 9/2015 | Muthyala | G06F 11/1464 707/639 |
| 2016/0041884 A1 | 2/2016 | Iwasaki | |

* cited by examiner

*Primary Examiner* — Jau Shya Meng
(74) *Attorney, Agent, or Firm* — Workman Nydegger

(57) ABSTRACT

Systems and methods for backing up data. A backup operation can identify blocks that have changed since a most recent backup operation. The blocks that have changed since the most recent backup operation are compared with the blocks that are being used. Only the blocks that are both used and have changed are backed up. This can reduce the size of the backup be excluding blocks that may have changed but are no longer used.

18 Claims, 4 Drawing Sheets

MINIMIZING A FOOTPRINT OF INCREMENTAL BACKUPS

CROSS-REFERENCE TO RELATED APPLICATIONS

The present application is a Continuation of U.S. patent application Ser. No. 14/871,145, filed Sep. 30, 2015, and scheduled to issue on Oct. 16, 2018 as U.S. Pat. No. 10,102,078, which is incorporated by reference herein.

FIELD OF THE INVENTION

Embodiments of the present invention relate to systems and methods for protecting data. Embodiments of the invention further relate to systems and methods for backing up data and more particularly to systems and methods for minimizing a size of the backups.

BACKGROUND

Computing systems have become an integral part of life. Businesses and individuals use computer systems and devices, and these computing systems and devices connect over various networks. The data stored or used by those computing systems is usually very important. A business may be able to survive the loss of hardware. However, that same business may not be able to survive a loss of data. In addition, the amount of data used or maintained by an entity or even an individual continually increases over time.

As a result, protecting data is now a fundamental consideration for businesses and individuals or other entities. Data protection systems protect data in various ways. Primarily, data protection systems protect data by making a backup of the data. If a failure or incident occurs in the primary system that affects data, the affected data can be recovered from the backups.

It can be appreciated, however, that backups can require significant storage space for various reasons. For example, the amount of data that is backed up typically grows as new data is generated. In another example, existing data may be changed or modified over time and there may be a desire to maintain a backup of the data at is presently exists as well as a backup of the data as it existed in the past. Some entities may want to have redundant backups of their data. In each of these examples, the storage requirements for backups can be significant and can grow over time. As a result, systems and methods are needed to reduce the storage space required to store backups.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the invention relate to systems and methods for protecting data and more particularly to systems and methods for backup up data. Embodiments of the invention further relate to systems and methods for performing backup operations including incremental backup operations. Embodiments of the invention further relate to systems and methods for minimizing the size or footprint of backups including minimizing the size of incremental backups.

An incremental backup operation is usually performed after a full backup operation has been performed or after an earlier incremental backup. An incremental backup can be performed with respect to a storage device (or devices), a volume, a virtual disk or volume, a data share, file system, or the like or combination thereof. The data associated with a particular backup may include multiple storage devices. An incremental backup operation can be performed by tracking changes that occur to blocks (or other unit) in the data being protected by a change block tracker, which may operate in the context of a kernel of an operating system. When an incremental backup operation is performed, the blocks that need to be included in the incremental backup (e.g., those that have changed since the last backup) can be identified from logs maintained by the change block tracker. The change block tracker effectively identifies the blocks in the data set being backed up that have changed since the most recent backup operation.

Embodiments of the invention may reduce the number of blocks identified by the change block tracker. Stated differently, there may be some blocks that have changed that do not need to be backed up. For example, blocks associated with a deleted file may be identified as changed, but do not need to be backed up. The number of blocks to be backed up can be reduced by filtering or comparing the blocks identified by the change block tracker with a bitmap or other data structure of the file system that identifies used blocks. This allows blocks that have changed but do not need to be backed up (e.g., deleted blocks) to be excluded from the incremental backup operation and thus excluded from the incremental backup. The remaining blocks are backed up in the backup operation. Because some of the blocks have been excluded from the backup operation, the size of the incremental backup is reduced if not minimized.

Figure 1:
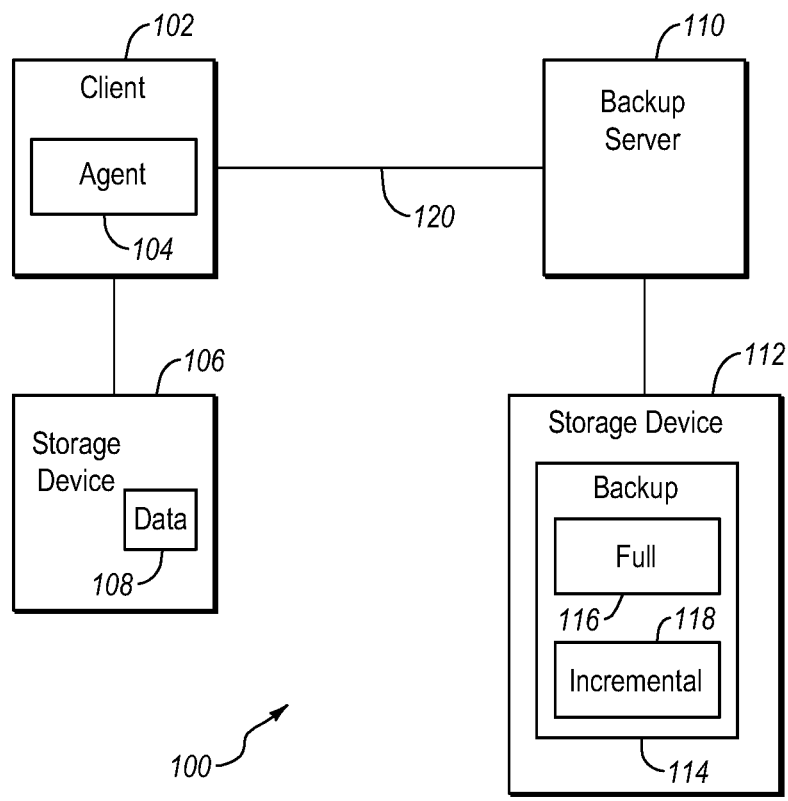
FIG. 1 illustrates an example of an environment in which data may be backed up by a backup application.

FIG. 1 illustrates an example of an environment in which blocks (or other unit) of a data set (e.g., a file system) to be included in a backup are identified and backed up. FIG. 1 illustrates a computing system 100. The system 100 includes a client 102 that can communicate with a backup server 110 over a network 120. The client 102 may be associated with or include a storage device 106. The storage device 106 stores data 108 that is associated with the client 102. The storage device 106 may include multiple devices and/or multiple volumes.

The storage device 106 can be local to the client 102 or accessed over a network connection. Alternatively, the client 102 may be a file server device and the storage device 106 is the storage of the file server. More generally, the client 102 is associated with the data 108 that is the data to be backed up during a backup operation. The data stored on the storage device 106 may be used or accessed by other clients in the computing system 100. In one example, the client 102 includes a file system such as an ext3 or ext4 file system.

To perform a backup operation, the backup server 110 may communicate with an agent 104 executing on the client 102. The agent 104 and the backup server 110 cooperate to perform a backup operation and to store backups 114 of the data 108 on a storage device 112, which may be associated with the backup server 110. The backups 114 may include full backups 116, incremental backups 118, or the like. The full backups 116 and the incremental backups 118 are examples of save sets. Each backup may be a save set. The save set may be stored in a container. For example, the backup may be an image that is stored in a container. This can apply to both virtual and non-virtual disks or volumes.

For example, a backup operation may create a backup image in a VHDx container. Full backups contain either all blocks or used blocks of the volume in a VHDx. Incremental backups contain changed blocks embedded in the VHDx container. To obtain the used blocks for incremental backups, the change block tracker may be used. The change block tracker will monitor managed volumes to see if any block is updated or changed. If a block is updated then the change block tracker will note the block number and block offset. When an incremental backup is triggered, the change block tracker is consulted to obtain or identify the changed blocks. Some of the blocks identified by the change block tracker are then excluded from the backup operation and the remaining blocks are backed up. The excluded blocks can be identified, in one example, by comparing the changed blocks with blocks that are actually used in the file system.

The backup server 110 may communicate with multiple clients such as, but not limited to, end user devices, servers (e.g., email, file, database), or the like. The backup server 110 may be configured to backup or protect all of the data that may be stored in the system 100. The system may include multiple file servers and multiple storage devices. As previously stated, a backup operation can be specific to a device, a volume, or the like.

Figure 2:
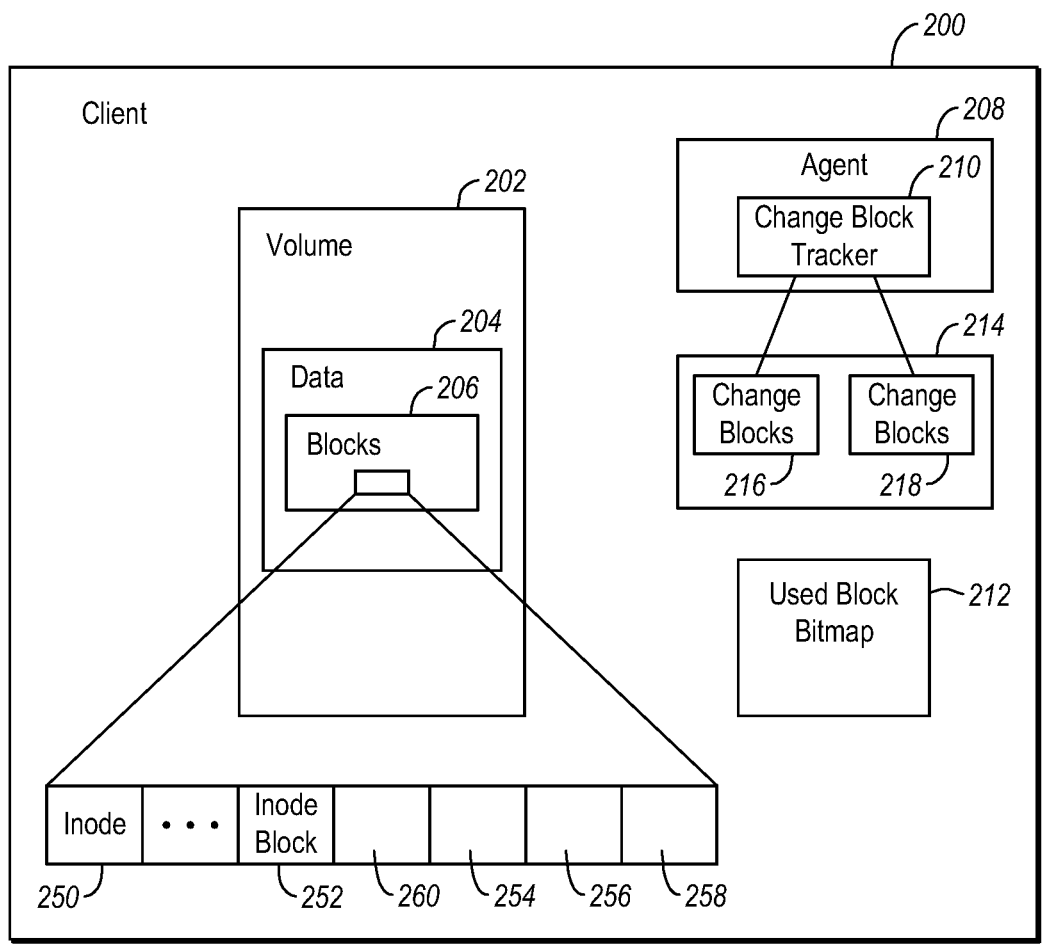
FIG. 2 illustrates an example of a device in which data to be backed up is identified.

FIG. 2 illustrates a block diagram of a client. The client may be a server such as a file server or other server or device. FIG. 2 illustrates a client 200, which is an example of the client 102. FIG. 2 illustrates an agent 208 that is associated with the client 200. The agent 208 may be running on the client 200 or remotely from the client 200. The agent 208 may also be associated with or include a change block tracker 210.

The change block tracker 210 may be implemented as a driver and is associated with change block logs 214. The change block tracker 20 may store information in the change block logs 214 related to changes made to blocks in file system or data set. The change block tracker 210 maintains one or more files such as change block log 216 and change block log 218. In one example, the change block tracker 210 may only require a single log or may maintain multiple logs. The change block log 216 identifies blocks that have changed since the last backup operation. When an instruction to perform a backup operation is issued, the change block tracker 210 stops recording blocks that have changed in the change block log 216 and begins tracking blocks that change after the backup operation is initiated in the change block log 218. Once the backup operation is complete, the change block log 216 can be discarded or reset.

FIG. 2 further illustrates a volume 202, which may be a disk drive or other partition of storage space. The volume 202 may be a logical drive or a single accessible storage area, a virtual volume or disk, or the like. Data 204 is stored on the volume 202 and the data includes blocks 206. In one example, the file system of the volume 202 may use inodes. The file system may be an ext3 file system or an ext4 file system in one example. A block may be a sequence of bytes or bits and may have a predetermined size. A block maybe a group of sectors between 1 KiB and 64 KiB in one example and the number of sectors is an integral power of 2.

Thus, a block is a group of sectors and a block group is a collection of blocks. For example, the volume 202 may include inodes. An inode, by way of example only, may be a data structure that stores all information about a file. However, there may be some information about a file that may not be stored in an inode. Different file systems may define inodes or equivalent structures in different ways. In one example, an inode may include information that identifies a file type, permissions, owner, group, file size, links or pointers to data, or the like or combination thereof.

For example, a disk layout may include a boot block and a number of block groups. Each block group may include a super block (1 block), group descriptors (n blocks), a data block bitmap (1 block), an inode bitmap (1 block), an inode table (n blocks), and data blocks (n blocks). The block bitmap of a block group may identify which blocks in the block group that are used and which blocks are unused. This information can be collected for each of the block groups and compared to the blocks identified by the change block tracker. The results of the comparison allows some of the blocks identified by the change block tracker to be removed or excluded from the backup operation and thus excluded from the backup.

When the file system operates, files are read, written, deleted, modified, or created by way of example. Some of these events lead to changes in the blocks associated with the files. Changes may also occur to the inodes associated with the files. Changes to the inode blocks may also be tracked in one example.

For example, the change block tracker 210 will note or identify in the change blocks 214 blocks that are affected by operations in the file system. For example, creating a file results in the allocation of blocks. Blocks may be allocated when an existing file becomes larger. An existing block may be modified when data is written to a file. When content is deleted from a file, some of the blocks are affected or deemed changed and the changed blocks may be reflected in the change block log 214. Also, some blocks pertaining to an inode may be deemed modified when a file is deleted in one example. In one example, all the blocks pertaining to a file are not modified when a file is deleted. Only the respective inode block in the inode bitmap are reset. When the file is modified firs and then deleted between two backups, the modified blocks of the file that are tracked by the change block tracker 210 are excluded from the backup. These types of changes may be reflected in the changed block log 214 maintained by the change block tracker 210.

For example, inode 250 includes an inode block in 252 and data blocks in 254, 256, and 258 (the numbers in an actual file system would be different since each inode has a number in one example). If a user updates all the data blocks and then deleted inode 250, the change block tracker 210 will record that blocks 252, 254, 256 and 258 have changed in the changed block log 214. Embodiments of the invention ensure that these data blocks are not backed up because they have been deleted. This is determined when the blocks in the changed block log 214 are compared with the block bitmap 260, which identifies used blocks.

More specifically, the volume 202 or each block group in the volume 202 (e.g., a file system such as ext3 or ext4) is also associated with a used block bitmap 212. The used block bitmap 212 identifies blocks of the volume 202 or of the associated block group that are being used. The blocks identified as changed by the change block tracker 210 can be compared with the used block bitmap 212 for the volume or the used block bitmaps 212 of all of the block groups in the volume. The intersection of the change block log 214 and the used block bitmap 212 identifies the blocks to be included in the incremental backup.

The identification of the used blocks may depend on the file system. Embodiments of the invention may be implemented, by way of example and not limitation, in ext3/4 file systems. In one example, the volume 202 may be divided into equally sized block groups. As previously stated, each block group may have a set of inodes and data blocks. Each block group may also include a block bitmap and an inode bitmap. The block bitmap of a block group represents the data blocks used/unused in the block group. In this example, the file system can be parsed to identify all of the block groups and the used blocks of the volume 202 can be determined from all of block bitmaps of the block groups.

Figure 3:
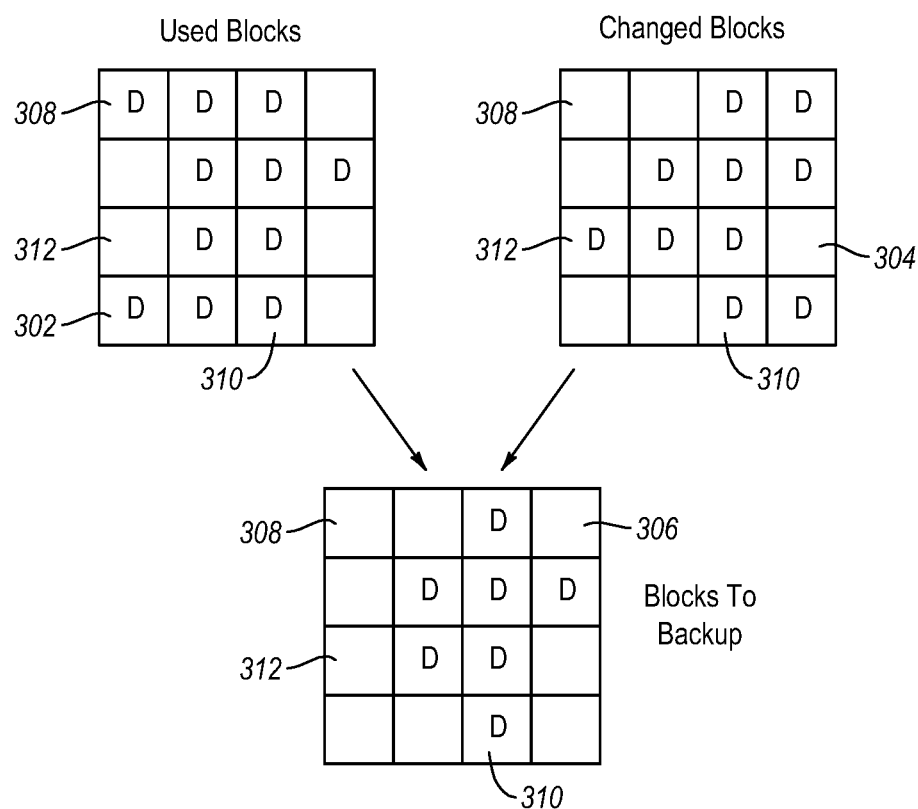
FIG. 3 illustrates an example of how data blocks are identified for a backup operation.

FIG. 3 illustrates an example of a method for identifying blocks to be included in an incremental backup. FIG. 3 illustrates a table 302 of used blocks. The table 302 is identified by parsing the file system in one example to identify the used blocks from the used block bitmap or from multiple used block bitmaps. This may include aggregating the used blocks from multiple block bitmaps. This may also depend on the layout of the file system.

The table 304 represent the blocks that have changed since the most recent backup operation. The table 304 is an example of a change block log 214 or may be generated from the change block log 214. The table 302 is then compared with the table 304 to generate the table 306. More generally, the used block bitmap is compared with the changed block log (e.g., a bitmap). The intersection of these bitmaps identifies the blocks to be backed up in the present backup operation.

For example, the block 308 is identified as being used in the used block bitmap or table 302. The block 308, however, has not changed since the most recent backup as illustrated in the changed block table 304. As a result, the block 308 is not identified in the table 306 as needing backup.

In another example, the block 310 is identified as used in the used block table 302. The block 310 is also identified as having changed since the last backup in the changed block table 304. By intersecting or comparing these tables, the block 310 is included in the table 306 as needing backup because the block 306 is both used and has changed.

In another example, the block 312 is determined to be unused from the used block table 302. The changed block table 304, however, indicates that the block 312 has changed since the last backup. Conventionally, the block 312 would be backed up. However, by comparing the table 302 and the table 304, the block 312 can be excluded from the backup operation. This is reflected in the table 306, which identifies that the block 312 does not require backing up. Advantageously, the size of the backup is thus reduced at least because the block 312 has been excluded.

Figure 4:
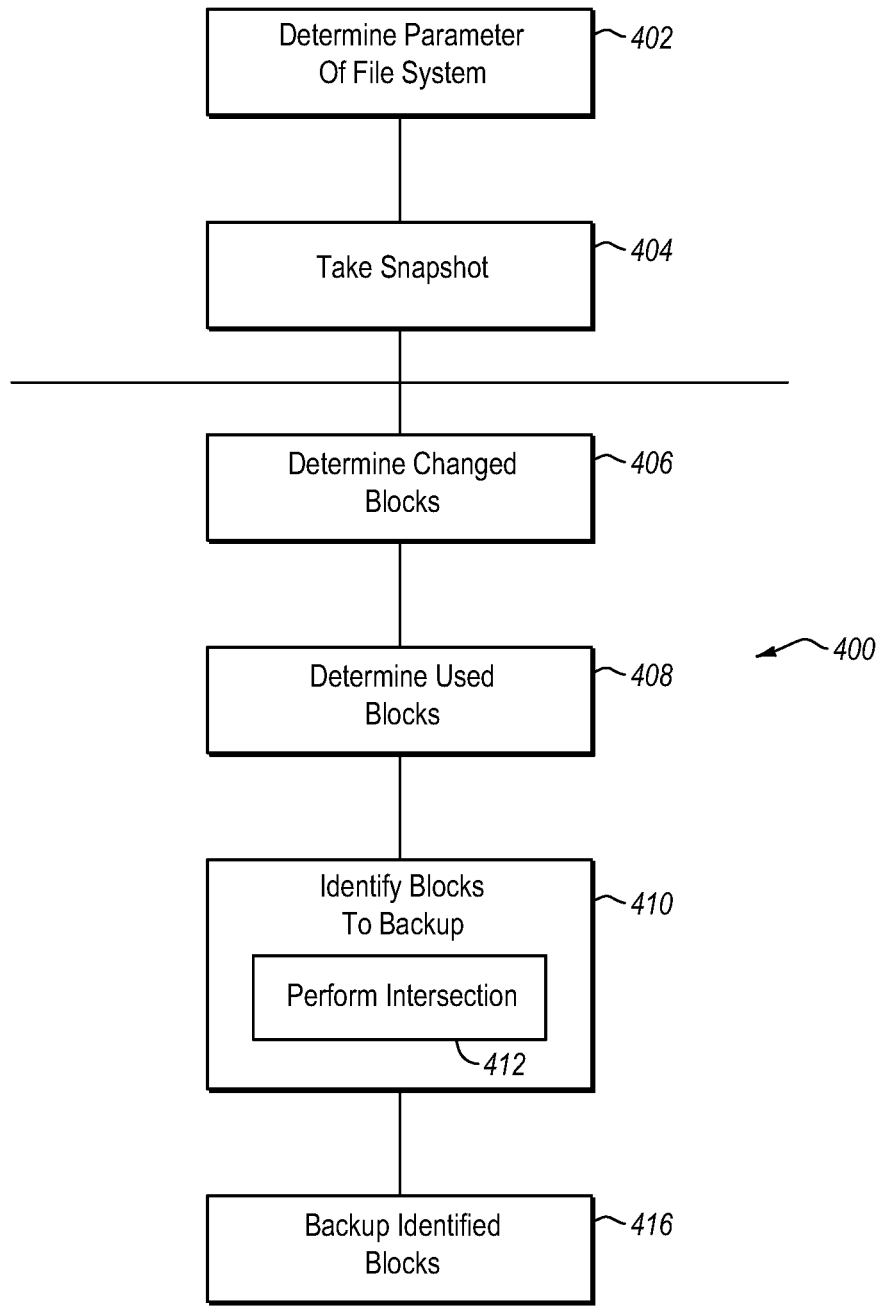
FIG. 4 illustrates an example of a method for performing a backup operation.

FIG. 4 illustrates an example of a method 400 for performing a backup operation. Some of the steps or acts may be performed for each backup operation while some of the steps or acts may be excluded in some instances. The method 400 begins, in one example, by determining parameters of a file system or volume in block 402. This may include identifying the volume to be backed up, identifying the file system or operating system, or the like. In one example, this may include identifying a starting offset of the file system by opening the volume handle.

Once the volume is open, a super block (if present in the file system) can be parsed to obtain the number of blocks per block group. A cluster size may also be determined from the super blocks. Then, the total number of block groups can be determined by dividing the number of blocks of the file system by the blocks per group.

In block 404, a snapshot of the volume is performed. When a snapshot is performed, the change block tracker may freeze the current change block log and start another change block log in preparation for the subsequent backup operation. This may create a snapshot volume that may be used to perform the backup operation.

In block 406, the blocks of the volume that have changed are determined. The blocks that have changed since the last backup operation can be determined from a change block log. Changed blocks are not limited to data blocks, but can also include other types of blocks in the file system. An inode block, for example, may change. The results may be stored in a variable of an appropriate type.

In block 408, the used blocks are identified or determined. This can include, for each block group for example, seeking to and reading the used data block bitmap. The result may be stored in a variable of an appropriate type.

In block 410, the blocks to be backed up are identified. These blocks can be determined by intersecting the results from the change block tracker with the used blocks in block 412. Blocks included in both the used block bitmap and the change block log are identified as needed to be backed up. Blocks that are in neither the used block bitmap nor the change block log are not backed up and blocks that are identified in only one of the used block bitmap and the change block log are not included in the backup operation. Thus, only blocks that have changed and that are currently used are included in the backup.

In block 416, the identified blocks are backed up by the backup operation. This can include creating a container and storing the actual data blocks that have changed and that are used in the container. The container may be stored by a backup server.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. As well, such media are examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The backup application residing on the backup server and the agent are example of modules or components or executables. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modulates running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

An example file system is ext4, which is described at https://ext4.wiki.kernel.org/index.php/Ext4_Disk_Layout, which is incorporated herein by reference.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for performing a backup operation, the method comprising:
   tracking used blocks on a storage device in a used block structure associated with a filesystem, wherein the used block structure identifies used blocks of the filesystem and unused blocks of the filesystem;
   tracking changed blocks on the storage device in a changed block structure since a previous backup operation by a processor;
   triggering an incremental backup operation for the storage device;
   in response to the triggered incremental backup operation, comparing the changed block structure with the used block structure to identify blocks that are both used and changed, wherein used blocks store data that needs to be included in the incremental backup operation; and
   backing up only the blocks that are both used and that have changed since the previous backup operation, wherein blocks that are unused and that have changed are not included in the backup operation, wherein unused blocks do not store data that needs to be included in the incremental backup operation.

2. The method of claim 1, wherein the storage device includes at least one of virtual disks, non-virtual disks or volumes.

3. The method of claim 1, further comprising tracking changes in a new change block structure after the triggering of the incremental backup.

4. The method of claim 1, wherein triggering an incremental backup operation includes taking a snapshot of the storage device.

5. The method of claim 4, wherein taking a snapshot includes taking a snapshot of a data set.

6. The method of claim 1, wherein comparing the used block structure with the changed block structure blocks includes intersecting the changed blocks with the used blocks to determine the blocks that are both used and that have changed.

7. The method of claim 1, further comprising storing copies of the blocks that are used and that have changed since the previous backup in a container.

8. The method of claim 1, further comprising storing copies of the blocks that are used and that have changed since the previous backup in a container.

9. A non-transitory computer readable medium comprising computer executable instructions that, when executed, cause a processor to perform a method for performing a backup operation, the method comprising:
   tracking used blocks on a storage device in a used block structure, the used block structure identifying blocks that are used;
   tracking changed blocks on the storage device in a changed block structure since a previous backup operation by a processor;
   triggering an incremental backup operation for the storage device;
   in response to the triggered incremental backup operation, comparing the changed block structure with the used block structure to identify blocks that are both used and changed, wherein used blocks store data that needs to be included in the incremental backup operation; and
   backing up only the blocks that are both used and that have changed since the previous backup operation, wherein unused blocks do not store data that needs to be included in the incremental backup operation.

10. The non-transitory computer readable medium of claim 9, wherein the storage device includes at least one of virtual disks, non-virtual disks or volumes.

11. The non-transitory computer readable medium of claim 9, the method further comprising tracking changes in a new change block structure after the triggering of the incremental backup.

12. The non-transitory computer readable medium of claim 9, wherein triggering an incremental backup operation includes taking a snapshot of the storage device.

13. The non-transitory computer readable medium of claim 12, wherein taking a snapshot includes taking a snapshot of a data set.

14. The non-transitory computer readable medium of claim 9, wherein comparing the used block structure with the changed block structure blocks includes intersecting the changed blocks with the used blocks to determine the blocks that are both used and that have changed.

15. A method for performing a backup operation to minimize a size of the a backup, the method comprising:
   tracking used blocks on a storage device in a used block structure, the used block structure identifying blocks that are used;
   tracking changed blocks on the storage device in a changed block structure since a previous backup operation by a processor;
   triggering an incremental backup operation for the storage device;
   in response to the triggered incremental backup operation, comparing the changed block structure with the used block structure to identify blocks that are both used and changed by performing an intersection between the used block structure and the changed block structure, wherein used blocks store data that needs to be included in the incremental backup operation; and
   backing up only the blocks that are both used and that have changed since the previous backup operation, wherein blocks that are used but have not changed are excluded from the backup and blocks that have changed but are not used are excluded from the backup, wherein used blocks do not store data that needs to be included in the incremental backup operation.

16. The method of claim 15, further comprising tracking multiple types of blocks including data blocks and inode blocks.

17. The method of claim 15, further comprising tracking changes in a new change block structure after the triggering of the incremental backup.

18. The method of claim 15, wherein triggering an incremental backup operation includes taking a snapshot of the storage device.

* * * * *